(12) United States Patent
Li

(10) Patent No.: US 11,146,570 B2
(45) Date of Patent: Oct. 12, 2021

(54) METHOD FOR OBTAINING FONT MAP, CHARACTER DISPLAY DEVICE AND SYSTEM, ELECTRONIC SIGNATURE TOKEN

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 2187 days.

(21) Appl. No.: 14/378,224

(22) PCT Filed: Dec. 28, 2012

(86) PCT No.: PCT/CN2012/087921
§ 371 (c)(1),
(2) Date: Aug. 12, 2014

(87) PCT Pub. No.: WO2013/120389
PCT Pub. Date: Aug. 22, 2013

(65) Prior Publication Data
US 2015/0163228 A1    Jun. 11, 2015

(30) Foreign Application Priority Data
Feb. 17, 2012   (CN) .......................... 201210038087.2

(51) Int. Cl.
*H04L 29/06* (2006.01)
*G06F 21/32* (2013.01)
*G06F 21/44* (2013.01)
*G06F 21/64* (2013.01)
*G06F 40/109* (2020.01)
*H04L 1/00* (2006.01)

(52) U.S. Cl.
CPC ............ *H04L 63/123* (2013.01); *G06F 21/32* (2013.01); *G06F 21/44* (2013.01); *G06F 21/64* (2013.01); *G06F 40/109* (2020.01); *H04L 1/00* (2013.01)

(58) Field of Classification Search
CPC ....... H04L 1/10; H04L 63/123; H04L 9/3247; G06F 21/64
See application file for complete search history.

(56) References Cited

U.S. PATENT DOCUMENTS

| | | | | |
|---|---|---|---|---|
| 5,533,174 A | * | 7/1996 | Flowers, Jr. | .......... G06F 3/1288 358/1.15 |
| 6,882,344 B1 | * | 4/2005 | Hayes | ...................... G09G 5/24 345/467 |
| 6,906,721 B1 | * | 6/2005 | Burrell | ..................... G06F 9/451 345/581 |

(Continued)

*Primary Examiner* — Ali S Abyaneh
(74) *Attorney, Agent, or Firm* — Ladas & Parry LLP

(57) ABSTRACT

A method for obtaining a font map, a character display device and system, and an electronic signature token are provided. The method comprises: receiving a font map sent from a font map storage device with a character display device; calculating a check code of the font map sent from the font map storage device with the character display device; comparing the calculated check code of the font map with a locally stored check code corresponding to the font map by the character display device, and if the two check codes are consistent, determining by the character display device that the font map sent from the font map storage device is correct.

19 Claims, 2 Drawing Sheets

```
┌─────────────────────────────────────────────┐
│  The transaction terminal sending a font map to the │ ╭─ 201
│         electronic signature token          │
└─────────────────────────────────────────────┘
                     │
                     ▼
┌─────────────────────────────────────────────┐
│  The electronic signature token calculating the │
│    check code of the font map sent from the    │ ╭─ 202
│             transaction terminal             │
└─────────────────────────────────────────────┘
                     │
                     ▼
┌─────────────────────────────────────────────┐
│   The electronic signature token comparing the  │
│  calculated check code of the font map sent from │ ╭─ 203
│ the transaction terminal with the check code of the │
│    font map of the character to be displayed    │
└─────────────────────────────────────────────┘
```

(56) References Cited

U.S. PATENT DOCUMENTS

2005/0038741 A1\* 2/2005 Bonalle ................ G06Q 20/102
705/40
2011/0276872 A1\* 11/2011 Kataria ................. G06F 40/109
715/234

\* cited by examiner

METHOD FOR OBTAINING FONT MAP, CHARACTER DISPLAY DEVICE AND SYSTEM, ELECTRONIC SIGNATURE TOKEN

RELATED APPLICATION

This application is a national phase entry under 35 USC 371 of International Patent Application No. PCT/CN2012/087921 filed on 28 Dec. 2012, which was published on 22 Aug. 2013 with International Publication Number WO 2013/120389 A1, which claims priority from Chinese Patent Application No. 201210038087.2 filed on 17 Feb. 2012, the entire contents of which are incorporated herein by reference.

FIELD

Embodiments of the present disclosure generally relate to an electronic technique filed, and more particularly, to method for obtaining a font map, a character display device, a character display system and an electronic signature token.

BACKGROUND

In conventional electronic signature tokens (such as a USBKEY), characters (including a Chinese character, a number, a letter and a symbol) are presented, exchanged and processed in a form of internal codes. When the character is required to be displayed, the electronic signature token converts the internal code of the character to be displayed into a zone bit code, and makes use of the zone bit code to extract a font map of the character to be displayed from a font library stored in the electronic signature token, and then displays the character by drawing points on the screen according to the font map information.

In this case, since font maps corresponding to all the characters to be displayed are required to be stored, the electronic signature token needs a large storage space. However, a memory in a security chip of the conventional electronic signature token cannot satisfy the requirement of storing such a large library. Thus, an extended memory external to the security chip is generally used to store the library, which increases a cost of the electronic signature token.

SUMMARY

Embodiments of the present disclosure seek to solve at least one of the problems existing in the related art to at least some extent and provide a method for obtaining a font map, a character display device, a character display system and an electronic signature token using the method for obtaining the font map, which can display the character by obtaining the font map stored in an external device (referred as a font map storage device, such as a transaction terminal including a computer and a mobile phone), thus reducing the cost of the character display device (such as the electronic signature token).

In order to solve the above problems, the present disclosure provides a method for obtaining a font map. The method includes: receiving a font map sent from a font map storage device with a character display device; calculating a check code of the font map sent from the font map storage device with the character display device; comparing the calculated check code of the font map with a locally stored check code corresponding to the font map by the character display device, and if the two check codes are consistent, determining by the character display device that the font map sent from the font map storage device is correct.

Furthermore, the character display device is an electronic signature token.

Furthermore, the font map storage device is a transaction terminal, and the transaction terminal is a computer or a mobile phone.

Furthermore, the character display device sends an identification code of the font map to the font map storage device; and the font map storage device sends the font map according to the identification code of the font map.

Furthermore, the font map storage device sends the font map and the identification code of the font map corresponding to the font map to the character display device.

Furthermore, the character display device displays a character corresponding to the font map sent from the font map storage device after determining that the font map sent from the font map storage device is correct.

Furthermore, the character display device calculates the check code of the font map sent from the font map storage device by using a CRC algorithm; or the character display device calculates the check code of the font map sent from the font map storage device by calculating a MAC value of the font map; or the character display device calculates the check code of the font map sent from the font map storage device by using a hash algorithm; or the character display device calculates the check code of the font map sent from the font map storage device by using a HOTP algorithm.

The present disclosure also provides a character display device. The character display device includes a display unit, a receiving unit, a calculating unit and a comparing unit. The receiving unit is configured to receive a font map sent from a font map storage device; the calculating unit is configured to calculate a check code of the font map received by the receiving unit; the comparing unit is configured to compare the check code of the font map calculated by the calculating unit with a locally stored check code corresponding to the font map and to determine the font map sent from the font map storage device is correct when the two check codes are consistent; and the display unit is configured to display a character corresponding to the font map received by the receiving unit after the comparing unit determines the font map sent from the font map storage device is correct.

Furthermore, the character display device further includes a storage unit, an extracting unit and an alarming unit. The storage unit is configured to store a check code library corresponding to a font library stored in the font map storage device; the extracting unit is configured to extract the check code of the font map from the storage unit and to send the check code to the comparing unit; and the alarming unit is configured to generate an alarm when the comparing unit determines the font map sent from the font map storage device is wrong.

Furthermore, the display unit is further configured to display error information when the comparing unit determines the font map sent from the font map storage device is wrong.

Furthermore, the calculating unit calculates the check code of the font map sent from the font map storage device by a CRC algorithm; or the calculating unit calculates the check code of the font map sent from the font map storage device by calculating a MAC value of the font map; or the calculating unit calculates the check code of the font map sent from the font map storage device by a hash algorithm;

or the calculating unit calculates the check code of the font map sent from the font map storage device by a HOTP algorithm.

The present disclosure also provides a character display system. The system includes a font map storage device and a character display device, in which the font map storage device is configured to store a font library for storing font maps corresponding to characters and to send a font map to the character display device; and the character display device is configured to receive the font map sent from the font map storage device, to calculate a check code of the received font map, to compare the calculated check code of font map with a locally stored check code corresponding to the font map, and to determine the font map sent from the font map storage device is correct and to display a character corresponding to the font map if the two check codes are consistent.

Furthermore, the character display device is further configured to send an identification code of the font map to the font map storage device; and the font map storage device is further configured to send the font map according to identification code of the font map.

Furthermore, the font map storage device is further configured to send the font map and the identification code of the font map corresponding to the font map to the character display device.

Furthermore, the character display device is further configured to store a check code library corresponding to the font library stored in the font map storage device and to display error information or an alarm if the font map sent from the font map storage device is determined to be wrong.

Furthermore, the character display device calculates the check code of the font map sent from the font map storage device by a CRC algorithm; or the character display device calculates the check code of the font map sent from the font map storage device by calculating a MAC value of the font map; or the character display device calculates the check code of the font map sent from the font map storage device by a hash algorithm; or the character display device calculates the check code of the font map sent from the font map storage device by a HOTP algorithm.

The present disclosure also provides an electronic signature token. The electronic signature token includes: a font map processing module, configured to receive a font map sent from a font map storage device, to calculate a check code of the received font map, to compare the calculated check code of font map with a locally stored check code corresponding to the font map and to determine the font map sent from the font map storage device is correct if the two check codes are consistent; and a display screen, configured to display a character corresponding to the font map received by the font map processing module after the font map processing module determines the font map sent from the font map storage device is correct.

Furthermore, the font map processing module is further configured to store a check code library corresponding to a font library stored in the font map storage device.

Furthermore, the electronic signature token further includes a buzzer or a voice output device configured to generate an alarm when the font map processing module determines the font map sent from the font map storage device is wrong.

Furthermore, the display screen is further configured to display error information when the font map processing module determines the font map sent from the font map storage device is wrong.

Furthermore, the font map processing module calculates the check code of the font map sent from the font map storage device by a CRC algorithm; or the font map processing module calculates the check code of the font map sent from the font map storage device by calculating a MAC value of the font map; or the font map processing module calculates the check code of the font map sent from the font map storage device by a hash algorithm; or the font map processing module calculates the check code of the font map sent from the font map storage device by a HOTP algorithm.

In conclusion, the character display device and the electronic signature token according to embodiments of the present disclosure store check codes of font maps corresponding to characters. Since the check code usually has two bytes, four bytes, six bytes or eight bytes, a storage space is saved as compared with storing font maps (32 bytes) directly, such that an extended memory external to the security chip is not needed to store the font map, thus reducing cost.

In addition, by storing the font map corresponding to the character in the eternal font map storage device, making the check code stored in the character display device and the electronic signature token correspond with the font map stored in the transaction terminal, calculating the check code of the font map sent from the font map storage device, comparing the calculated check code with the locally stored check code, and displaying the character corresponding to the font map if the two check codes are consistent, the correctness and security of the font map sent from the transaction terminal are ensured.

BRIEF DESCRIPTION OF THE DRAWINGS

In order to explicitly illustrate a technical solution of embodiments of the present disclosure, a brief introduction for the accompanying drawings corresponding to the embodiments will be listed as follows. Apparently, the drawings described below are only corresponding to some embodiments of the present disclosure, and those skilled in the art may obtain other drawings according to these drawings without creative labor.

DETAILED DESCRIPTION

The present disclosure will be described below in detail with reference to drawings and embodiments. Apparently, the described embodiments are only some embodiments of the present disclosure rather than all the embodiments. Other embodiments obtained by those skilled in the art based on the described embodiments without creative labor fall into the scope of the present disclosure.

A key point of the present disclosure is described as follows. A character display device (such as an electronic signature token) stores check codes of font maps corresponding to characters, a font map storage device (such as a transaction terminal connected with the electronic signature token, including a computer and a mobile phone) stores font maps corresponding to the characters, and the check codes stored in the electronic signature token are corresponding with the font maps stored in the transaction terminal, the electronic signature token extracts the check code of the font map corresponding to the character to be displayed, calculates the check code of the font map sent from the transaction terminal, compares the calculated check code with the locally stored check code, and displays the character corresponding to the font map if the two check codes are consistent.

The present disclosure will be described in detail with reference to drawings and embodiments as follows.

First Embodiment

Figure 1:
FIG. 1 is a block diagram of a character display system according to the present disclosure.

FIG. 1 is a block diagram of a system for obtaining a font map according to the present disclosure. In this embodiment, the system for obtaining a font map includes a transaction terminal (a font map storage device) and an electronic signature token (a character display device).

Specifically, the transaction terminal may be a computer or a mobile phone, and has a font library for storing font maps corresponding to characters. The characters may include Chinese characters (traditional Chinese characters and simplified Chinese characters), numbers, letters, symbols and special characters, etc.

The electronic signature token is configured to store check codes of font maps corresponding to characters to form a check code library. The check code library is corresponding to a font library stored in the transaction terminal. Certainly, the check code library can be corresponding to the font library via identification codes of the font maps (such as internal codes, region codes or customized identification code of the font map). The electronic signature token extracts the check code of the font map corresponding to the character to be displayed from the check code library, calculates the font map sent from the transaction terminal to obtain the check code of the font map sent from the transaction terminal, compares the calculated check code with the extracted check code of the font map corresponding to the character to be displayed, and displays the character corresponding to the font map if the two check codes are consistent.

Figure 2:
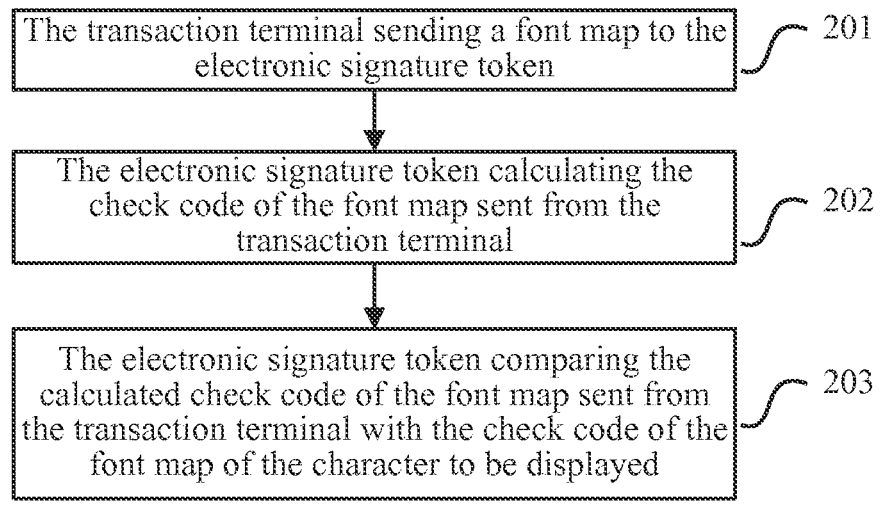
FIG. 2 is a flow chart of a method for obtaining a font map according to a first embodiment of the present disclosure.

FIG. 2 is a flow chart of a method for obtaining a font map according to a first embodiment of the present disclosure. In this embodiment, the method for obtaining the font map includes following steps.

At step S201, the transaction terminal sends the font map to the electronic signature token.

Specifically, the transaction terminal can send the font map of the character to be displayed by the electronic signature token according to a request from the electronic signature token. For example, the electronic signature token sends the internal code to the transaction terminal, and the transaction terminal sends the font map corresponding to the internal code. The transaction terminal can also send the font map of the character to be displayed by the electronic signature token without a request from the electronic signature token, for example the transaction terminal sends the font map and the internal code together to the electronic signature token. Certainly, the transaction terminal can send font maps corresponding to characters to the electronic signature token one by one, and can also send the font maps corresponding to a plurality of characters to the electronic signature token simultaneously.

At step S202, the electronic signature token calculates the check code of the font map sent from the transaction terminal.

Specifically, the electronic signature token calculates CRC values of respective font maps in advance by a CRC (Cyclical Redundancy Check) algorithm, and uses the CRC values of respective font maps as check codes to form the check code library stored in a security chip of the electronic signature token. The check code library is corresponding to the font library stored in the transaction terminal.

The electronic signature token calculates the CRC value of the font map sent from the transaction terminal to obtain the check code of the sent font map.

At step S203, the electronic signature token compares the calculated check code of the font map sent from the transaction terminal with the extracted check code of the font map corresponding to the character to be displayed, and displays the character corresponding to the font map if the two check codes are consistent.

Specifically, when the electronic signature token needs to display a character "李" (Li), the electronic signature token extracts the check code of the character "李" (Li) from the pre-stored check code library. In normal conditions, the transaction terminal sent the font map "李" (Li), and the electronic signature token calculates the CRC value of the font map "李" (Li) according to the font map "李" (Li) sent from the transaction terminal, so as to obtain the check code of "李" (Li). Then, the electronic signature token compares the calculated check code of "李" (Li) with the extracted check code of "李" (Li), and displays "李" (Li) if the two check codes are consistent. Otherwise, if the font map "李" (Li) is tampered to be "赵" (Zhao) when the transaction terminal is sending it, the electronic signature token calculates the CRC value of "赵" (Zhao) to obtain the check code of "赵" (Zhao), compares the check code of "赵" (Zhao) with the extracted check code of "李" (Li) to be displayed, and determines that the two check codes are not consistent. Thus, the electronic signature token does not display the character or generates an alarm, such as displaying "error" or generating a voice alarm. With this comparison method, the transaction terminal can be prevented from being tampered during sending the font map, thus improving the security.

Figure 3:
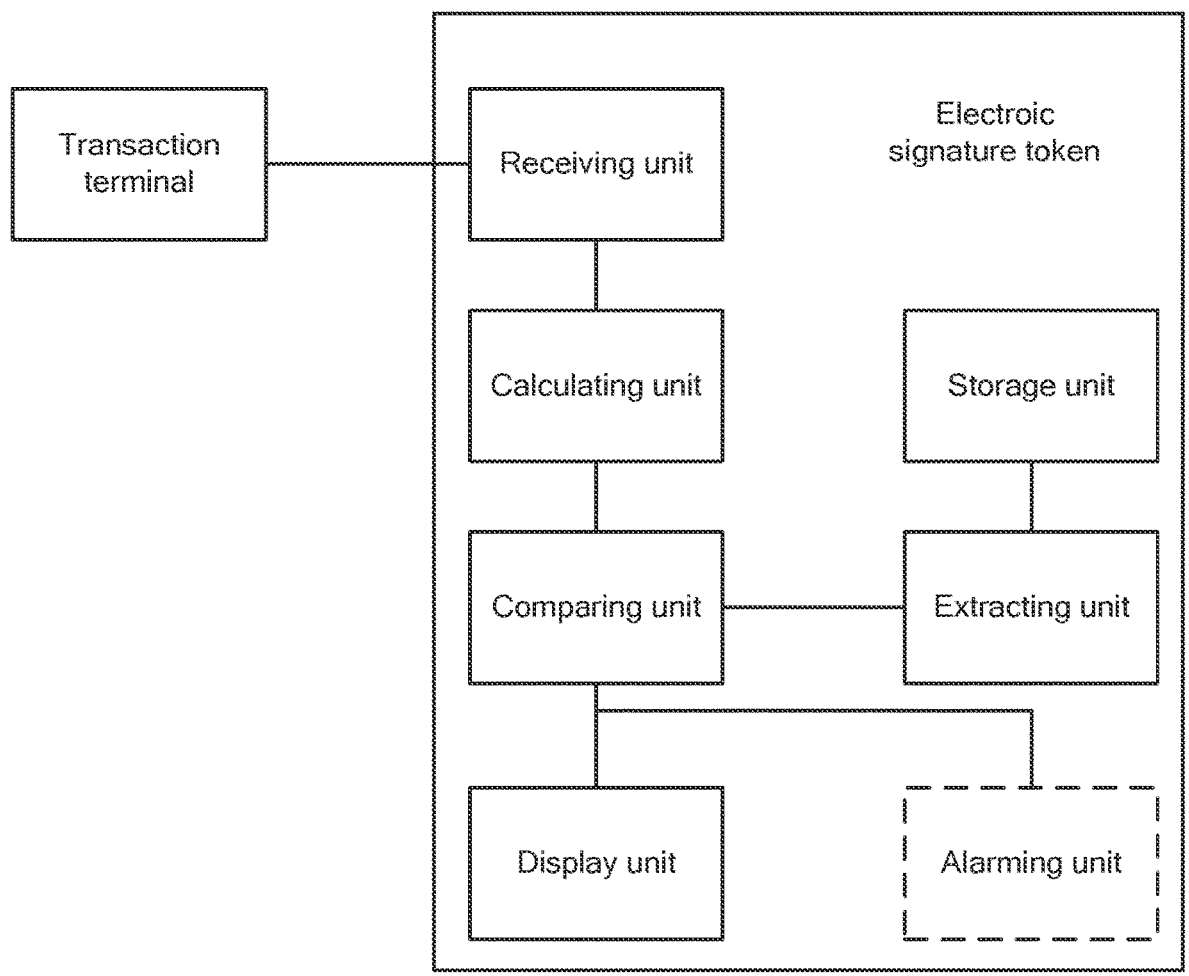
FIG. 3 is a block diagram of a character display device according to a first embodiment of the present disclosure.

FIG. 3 is a block diagram of a character display device according to a first embodiment of the present disclosure. In this embodiment, the character display device includes a receiving unit, a calculating unit, a storage unit, a display unit, an extracting unit and a comparing unit.

The receiving unit is configured to connect with the transaction terminal and to receive the font map sent from the transaction terminal.

The calculating unit is connected with the receiving unit and is configured to calculate the check code of the font map sent from the transaction terminal and received by the receiving unit.

The storage unit is configured to store the check code library corresponding to the font library stored in the transaction terminal.

The display unit is configured to display the character to be displayed or error information.

The extracting unit is connected with the storage unit and is configured to extract the check code of the font map corresponding to the character to be displayed from the check code library stored in the storage unit.

The comparing unit is connected with the extracting unit, the calculating unit and the display unit respectively and is configured to compare the check code calculated by the calculating unit with the check code extracted by the extracting unit, to send display information to the display unit to display the character when the two check codes are consistent, and to send error information to the display unit for displaying if the two check codes are not consistent.

Certainly, the character display device according to the present disclosure may further include an alarming unit. The alarming unit is connected with the comparing unit and is configured to generate the voice alarm when the comparing unit determines that the check code calculated by the calculating unit is not consistent with the check code obtained by the extracting unit.

Figure 4:
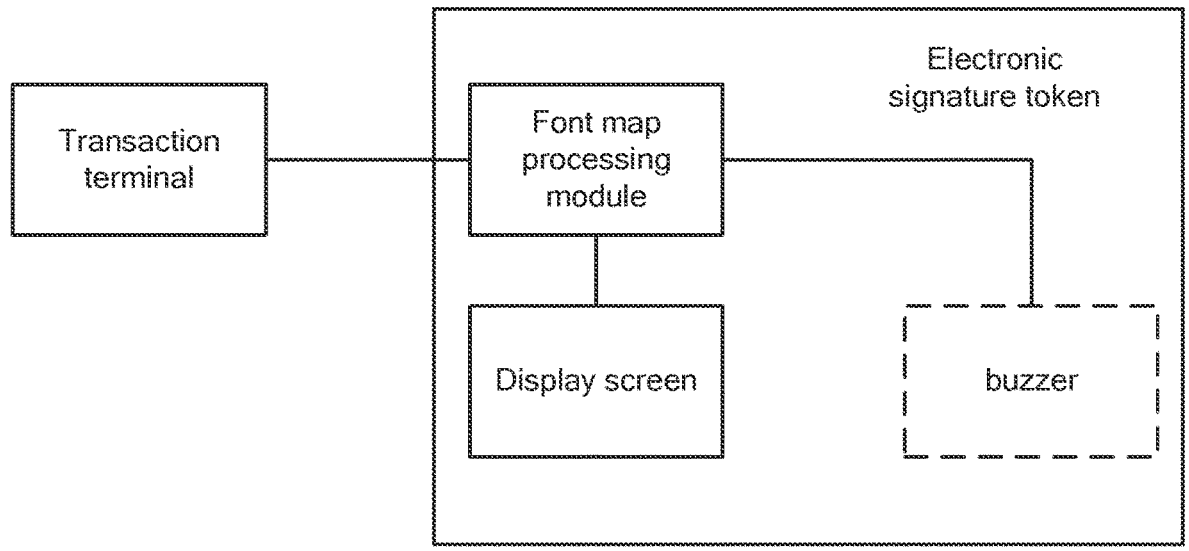
FIG. 4 is a block diagram of an electronic signature token according to a first embodiment of the present disclosure.

FIG. 4 is a block diagram of an electronic signature token according to a first embodiment of the present disclosure. In this embodiment, the electronic signature token includes a font map processing module and a display screen.

The font map processing module is connected with the display screen and is configured to store the check code library corresponding to the font library stored in the transaction terminal, to receive the font map sent from the transaction terminal, to calculate the check code of the font map received from the transaction terminal, to extract the check code of the font map corresponding to the character to be displayed from the stored check code library, to compare the calculated check code of font map sent from the transaction terminal with the extracted check code of the font map corresponding to the character to be displayed, to send the display information to the display screen to display the character if the two check codes are consistent, and to send the error information to the display screen for displaying if the two check codes are not consistent.

Generally, the font map processing module may be integrated in the security chip.

The display screen is configured to display the character to be displayed or the error information.

Certainly, the electronic signature token according to the present disclosure may further include a buzzer or a voice output device. The buzzer or voice output device is connected with the font map processing module and is configured to generate a voice alarm when the font map processing module determines that the calculated check code of the font map sent from the transaction terminal is not consistent with the extracted check code of the font map corresponding to the character to be displayed.

Certainly, in this embodiment, the step of extracting the check code of the font map of the character to be displayed may occur simultaneously with step S201, between step S201 and step S202, simultaneously with step S202 or between step S202 and step S203.

In embodiments of the present disclosure, the electronic signature token may store a first-level character library and store check codes of other character libraries not included in the first-level character library. When the character to be displayed is not included in the first-level character library, the check code of the font map corresponding to the character to be displayed is calculated and verified, and the character is displayed when the verification is passed. By storing the first-level character library, characters in the first-level character library may be displayed directly without calculating check codes, thus improving a display speed.

In embodiments of the present disclosure, when the electronic signature token determines that the calculated check code of the font map sent from the transaction terminal is consistent with the extracted check code of the character to be displayed, it may further store the font map corresponding to the check code. When the character is to be displayed next time, the transaction terminal is not required to send the font map and a check code calculation is also not required, thus improving the display speed.

Second Embodiment

A difference between the first embodiment and the second embodiment is how to obtain the check code. In this embodiment, the electronic signature token calculates MAC (Message Authentication Code) values of respective font maps in advance, and uses the MAC values as the check codes to form the check code library stored in the security chip of the electronic signature token. The check code library is corresponding to the font library stored in the transaction terminal.

When the electronic signature token receives the font map sent from the transaction terminal, it calculates the check code of the font map sent from the transaction terminal according to the calculated MAC value.

Certainly, if the calculated MAC value is too large, a few bytes of the MAC value may be captured as the check code, thus saving a space for storing the check code library in the electronic signature token.

After calculating the MAC value, the electronic signature token may further encrypt the MAC value with a secret key to obtain an encrypted MAC value and use the encrypted MAC value as the check code.

Third Embodiment

A difference between the third embodiment and the first embodiment is how to obtain the check code. In this embodiment, the electronic signature token calculates HASH values of respective font maps by using a HASH algorithm (such as MD5 algorithm (fifth version of Message Digest Algorithm)) and uses the HASH values as the check codes to form the check code library stored in the security chip of the electronic signature token. The check code library is corresponding to the font library stored in the transaction terminal.

When the electronic signature token receives the font map sent from the transaction terminal, it calculates the check code of the font map sent from the transaction terminal according to the calculated HASH value.

Certainly, if the calculated HASH value is too large, a few bytes of the HASH value may be captured as the check code, thus saving the space for storing the check code library in the electronic signature token.

Fourth Embodiment

A difference between the fourth embodiment and the first embodiment is how to obtain the check code. In this embodiment, the electronic signature token calculates HOTP values of respective font maps by using a HOTP algorithm and captures a part of each HASH value as the check code to form the check code library stored in the security chip of the electronic signature token. The check code library is corresponding to the font library stored in the transaction terminal.

When the electronic signature token receives the font map sent from the transaction terminal, it calculates the check code of the font map sent from the transaction terminal according to the calculated HOTP value.

Certainly, during calculating the HOTP value, a HASH algorithm which obtains a digest value with a secret key may be adopted. In other embodiments, the digest value may also be obtained directly without using the secret key.

In embodiments of the present disclosure, the electronic signature token stores check codes of font maps corresponding to characters. Since the check code usually has two bytes, four bytes, six bytes or eight bytes, a storage space is saved as compared with storing font maps (32 bytes) directly, such that an extended memory external to the security chip is not needed to store the font map, thus reducing cost.

In addition, by storing the font map corresponding to the character in the transaction terminal (such as the computer and the mobile phone) and making the check code stored in the electronic signature token correspond with the font map stored in the transaction terminal, the electronic signature token can extract the check code of the font map corresponding to the character to be displayed, calculate the check code of the font map sent from the transaction terminal, compare the calculated check code with the extracted stored check code, and display the character corresponding to the font map if the two check codes are consistent, thus ensuring the correctness and security of the font map sent from the transaction terminal.

What are described above are just preferred embodiments of the present disclosure, and the protection scope of the present disclosure is not limited to these. The changes or alternatives, which are easily reached by those skilled in the art in the technical scope disclosed by the present disclosure, all fall into the protection scope of the present disclosure. Thus, the protection scope of the present disclosure is subject to a protection scope of claims.

What is claimed is:

1. A method for obtaining a font map, comprising:
   receiving a font map sent from a font map storage device by an electronic signature token;
   calculating a check code of the font map sent from the font map storage device by the electronic signature token;
   comparing the calculated check code of the font map with a locally stored check code corresponding to the font map by the electronic signature token, and if the two check codes are consistent, determining by the electronic signature token that the font map sent from the font map storage device is correct; and
   displaying by the electronic signature token a character corresponding to the font map sent from the font map storage device after determining that the font map sent from the font map storage device is correct.

2. The method according to claim 1, wherein the font map storage device is a transaction terminal, and the transaction terminal is a computer or a mobile phone.

3. The method according to claim 1, wherein
   the electronic signature token sends an identification code of the font map to the font map storage device; and
   the font map storage device sends the font map according to the identification code of the font map.

4. The method according to claim 3, wherein the font map storage device sends the font map and the identification code of the font map corresponding to the font map to the electronic signature token.

5. The method according to claim 1, wherein
   the electronic signature token calculates the check code of the font map sent from the font map storage device by using a CRC algorithm; or
   the electronic signature token calculates the check code of the font map sent from the font map storage device by calculating a MAC value of the font map; or
   the electronic signature token calculates the check code of the font map sent from the font map storage device by using a hash algorithm; or
   the electronic signature token calculates the check code of the font map sent from the font map storage device by using a HOTP algorithm.

6. An electronic signature token, comprising a processor circuitry and a memory, the memory comprising stored program units comprising:
   a receiving unit, configured to receive a font map sent from a font map storage device;
   a calculating unit, configured to calculate a check code of the font map received by the receiving unit;
   a comparing unit, configured to compare the check code of the font map calculated by the calculating unit with a locally stored check code corresponding to the font map, and to determine the font map sent from the font map storage device is correct when the two check codes are consistent; and
   a display unit, configured to display a character corresponding to the font map received by the receiving unit after the comparing unit determines the font map sent from the font map storage device is correct.

7. The electronic signature token according to claim 6, wherein the stored program units further comprise:
   a storage unit, configured to store a check code library corresponding to a font library stored in the font map storage device;
   an extracting unit, configured to extract the check code of the font map from the storage unit and to send the check code to the comparing unit; and
   an alarming unit, configured to generate an alarm when the comparing unit determines the font map sent from the font map storage device is wrong.

8. The electronic signature token according to claim 6, wherein the display unit is further configured to display error information when the comparing unit determines the font map sent from the font map storage device is wrong.

9. The electronic signature token according to claim 6, wherein
   the calculating unit calculates the check code of the font map sent from the font map storage device by using a CRC algorithm; or
   the calculating unit calculates the check code of the font map sent from the font map storage device by calculating a MAC value of the font map; or
   the calculating unit calculates the check code of the font map sent from the font map storage device by using a hash algorithm; or
   the calculating unit calculates the check code of the font map sent from the font map storage device by using a HOTP algorithm.

10. An electronic signature token, comprising:
    a non-transitory font map storage device, configured to store a font library comprising font maps corresponding to characters and to send a font map; and
    a character display screen, configured to receive the font map sent from the font map storage device, to calculate a check code of the received font map, to compare the calculated check code of font map with a locally stored check code corresponding to the font map, to determine the font map sent from the font map storage device is correct and to display a character corresponding to the font map if the two check codes are consistent.

11. The electronic signature token according to claim 10, wherein the electronic signature token is further configured to send an identification code of the font map to the non-transitory font map storage device; and the non-transitory font map storage device is further configured to send the font map according to the identification code of the font map.

12. The electronic signature token according to claim 11, wherein the non-transitory font map storage device is further configured to send the font map and the identification code of the font map corresponding to the font map to the electronic signature token.

13. The electronic signature token according to claim 10, wherein the electronic signature token is further configured to store a check code library corresponding to the font library stored in the non-transitory font map storage device, and to display error information or an alarm if the font map sent from the non-transitory font map storage device is determined to be wrong.

14. The electronic signature token according to claim 10, wherein the electronic signature token calculates the check code of the font map sent from the non-transitory font map storage device by using a CRC algorithm; or the electronic signature token calculates the check code of the font map sent from the font map storage device by calculating a MAC value of the font map; or the electronic signature token calculates the check code of the font map sent from the non-transitory font map storage device by using a hash algorithm; or the electronic signature token calculates the check code of the font map sent from the non-transitory font map storage device by using a HOTP algorithm.

15. An electronic signature token, comprising:

a font map processing circuitry, configured to receive a font map sent from a font map storage device, to calculate a check code of the received font map, to compare the calculated check code of font map with a locally stored check code corresponding to the font map and to determine the font map sent from the font map storage device is correct if the two check codes are consistent; and a display screen, configured to display a character corresponding to the font map received by the font map processing circuit after the font map processing circuit determines the font map sent from the font map storage device is correct.

16. The electronic signature token according to claim 15, wherein the font map processing circuitry is further configured to store a check code library corresponding to a font library stored in the font map storage device.

17. The electronic signature token according to claim 15, further comprising:

a buzzer or a voice output device, configured to generate an alarm when the font map processing circuitry determines the font map sent from the font map storage device is wrong.

18. The electronic signature token according to claim 15, wherein the display screen is further configured to display error information when the font map processing circuitry determines the font map sent from the font map storage device is wrong.

19. The electronic signature token according to claim 15, wherein the font map processing circuitry calculates the check code of the font map sent from the font map storage device by using a CRC algorithm; or the font map processing circuitry calculates the check code of the font map sent from the font map storage device by calculating a MAC value of the font map; or the font map processing circuitry calculates the check code of the font map sent from the font map storage device by using a hash algorithm; or the font map processing circuitry calculates the check code of the font map sent from the font map storage device by using a HOTP algorithm.

\* \* \* \* \*